United States Patent
Fukada

(10) Patent No.: US 10,209,358 B2
(45) Date of Patent: Feb. 19, 2019

(54) OBJECT DETECTION USING SONIC WAVES

(71) Applicant: CANON KABUSHIKI KAISHA, Tokyo (JP)

(72) Inventor: Hiroshi Fukada, Fuchu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/434,331

(22) Filed: Feb. 16, 2017

(65) Prior Publication Data
US 2017/0254899 A1    Sep. 7, 2017

(30) Foreign Application Priority Data
Mar. 3, 2016 (JP) .................. 2016-041490

(51) Int. Cl.
*G01S 15/04* (2006.01)
*G01S 7/524* (2006.01)
*G01S 15/10* (2006.01)

(52) U.S. Cl.
CPC ............. *G01S 15/04* (2013.01); *G01S 7/524* (2013.01); *G01S 15/102* (2013.01); *G01S 15/107* (2013.01)

(58) Field of Classification Search
None
See application file for complete search history.

(56) References Cited

U.S. PATENT DOCUMENTS

| | | | | |
|---|---|---|---|---|
| 5,570,869 A * | 11/1996 | Diaz | ...................... | E03C 1/057 251/129.04 |
| 6,288,974 B1 * | 9/2001 | Nelson | .................... | G01S 17/89 367/13 |
| 6,437,702 B1 * | 8/2002 | Ragland | .................. | G01S 7/003 340/425.5 |
| 7,119,738 B2 * | 10/2006 | Bridgelall | ............... | G01S 13/32 340/572.1 |
| 7,456,740 B2 * | 11/2008 | Aldred | ................... | G01S 7/4021 340/13.1 |
| 8,558,694 B2 * | 10/2013 | Brandt | ................. | G06Q 10/087 340/539.13 |
| 8,903,669 B1 * | 12/2014 | Holly | ...................... | G01S 7/024 702/75 |
| 2001/0052850 A1 * | 12/2001 | Zimmerman | .......... | G06K 17/00 340/572.1 |
| 2004/0140886 A1 * | 7/2004 | Cleveland | ........... | G01S 7/52006 340/431 |
| 2004/0222887 A1 * | 11/2004 | Tsuji | ....................... | G01S 13/52 340/552 |
| 2005/0041529 A1 * | 2/2005 | Schliep | ................... | G01S 7/539 367/99 |
| 2005/0276163 A1 * | 12/2005 | Moon | .................... | G01S 15/102 367/92 |
| 2006/0012476 A1 * | 1/2006 | Markhovsky | ........... | G01S 13/74 340/539.32 |

(Continued)

FOREIGN PATENT DOCUMENTS

JP    H06-076199 A    3/1994

*Primary Examiner* — Curtis J King
(74) *Attorney, Agent, or Firm* — Venable, LLP

(57) ABSTRACT

A transmission unit is caused to transmit a first wave from a transmission unit that transmits waves, and a second wave. Based on a first reflected wave of the first wave and a second reflected wave of the second wave, it is determined whether there is an object outside of the apparatus.

12 Claims, 12 Drawing Sheets

(56) References Cited

U.S. PATENT DOCUMENTS

| | | | |
|---|---|---|---|
| 2006/0012511 A1* | 1/2006 | Dooi | G01S 7/02 342/70 |
| 2006/0222218 A1* | 10/2006 | Karaki | G06K 9/0002 382/124 |
| 2007/0195646 A1* | 8/2007 | Govindswamy | G01S 15/89 367/88 |
| 2008/0030325 A1* | 2/2008 | Fries | G06K 19/0701 340/539.32 |
| 2008/0117043 A1* | 5/2008 | Van Den Abeele | B61B 1/02 340/540 |
| 2009/0022010 A1* | 1/2009 | West | G01V 1/143 367/38 |
| 2009/0033462 A1* | 2/2009 | Kitayoshi | G06K 19/0723 340/10.1 |
| 2009/0046785 A1* | 2/2009 | Kado | G06F 13/4072 375/257 |
| 2009/0168603 A1* | 7/2009 | Okuda | B06B 1/0629 367/87 |
| 2010/0102758 A1* | 4/2010 | Sobagaki | F21V 23/0442 315/307 |
| 2010/0127837 A1* | 5/2010 | Addy | G08B 13/24 340/10.34 |
| 2010/0259611 A1* | 10/2010 | Keshavarzian | G07C 9/00111 348/143 |
| 2010/0291872 A1* | 11/2010 | Laroia | H04W 72/12 455/41.2 |
| 2010/0295678 A1* | 11/2010 | Suzuki | H04M 19/044 340/540 |
| 2013/0173057 A1* | 7/2013 | Balas | G01S 15/931 700/258 |
| 2013/0300573 A1* | 11/2013 | Brown | A61B 5/1113 340/870.01 |
| 2014/0118152 A1* | 5/2014 | Bartonek | G01L 5/0066 340/665 |
| 2017/0197510 A1* | 7/2017 | Curran | B60L 11/182 |

* cited by examiner

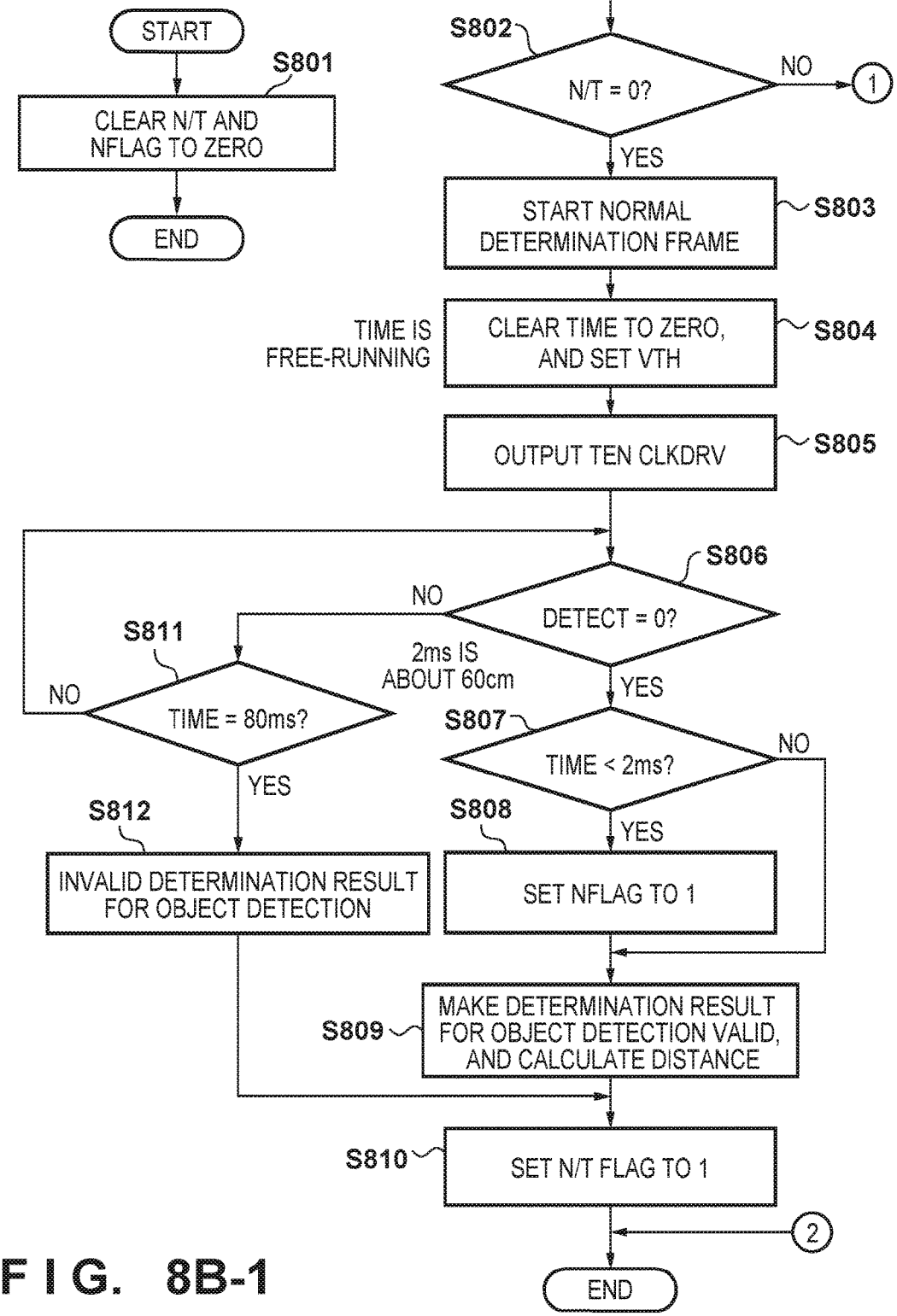

FIG. 9
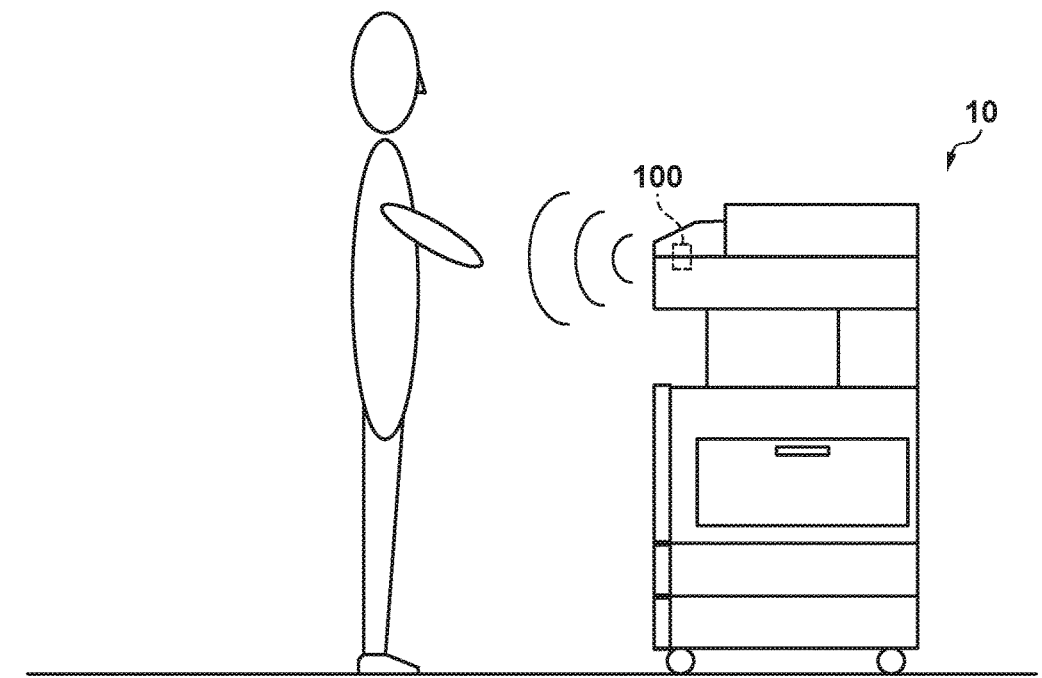
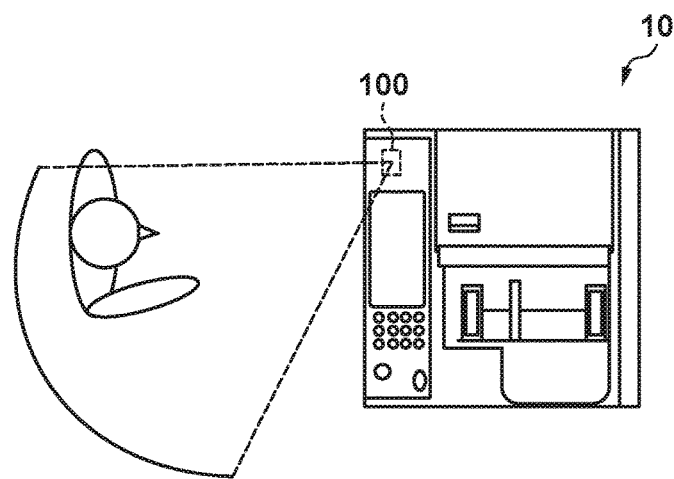

OBJECT DETECTION USING SONIC WAVES

BACKGROUND OF THE INVENTION

Field of the Invention

The present invention relates to an apparatus and a method for configuring a sensor that detects an object based on a reflected wave from the object.

Description of the Related Art

An ultrasonic sensor composed from an ultrasonic transmitter for outputting an ultrasonic wave from an ultrasonic oscillator and an ultrasonic receiver for detecting a reflected wave from an object is known. The ultrasonic sensor can detect the object in accordance with the detection of the reflected wave and measure a distance to the object from a detection time therefor. In contrast an ultrasonic oscillator has a characteristic of outputting reverberation waves for a short period while attenuating, even if an oscillation operation has stopped.

While there are direct waves comprised from reverberation waves and transmitted waves (also referred to as oscillation waves) of an ultrasonic oscillator, it is not possible to detect a reflected wave from an object because the ultrasonic receiver will receive a direct wave. In other words, even if an object is present at a short distance, it is not possible to distinguish whether the ultrasonic receiver is directly receiving a reverberation wave or whether it is receiving a reflected wave of the object that is present at a short distance.

Japanese Patent Laid-Open No. H6-76199 recites providing a short distance determination mode that makes an interval at which an ultrasonic wave is oscillated smaller for detecting an object that is positioned at a short distance.

However, in Japanese Patent Laid-Open No. H6-76199, in a case of detecting an object by the short distance determination mode, fixing is made to the short distance determination mode and during an interval therefor it becomes impossible to detect an object present at a long distance. For example, in the case of an ultrasonic sensor apparatus installed in a multifunction peripheral and having person detection as a main purpose, if hypothetically there is a fixed object proximal to the multifunction peripheral, with a configuration according to Japanese Patent Laid-Open No. H6-76199, it becomes impossible to detect a person who is positioned further than the fixed object.

SUMMARY OF THE INVENTION

An aspect of the present invention is to eliminate the above-mentioned problems with the conventional technology. The present invention provides an apparatus and a method for improving the accuracy of object detection by a sensor for detecting an object by a reflected wave.

The present invention in one aspect provides an apparatus having a sensor including a transmission unit for transmitting a wave and a reception unit for receiving a wave from outside, the apparatus comprising: a transmission control unit configured to cause the transmission unit to transmit a first wave and a second wave whose wavelength is shorter than the first wave; and a determination unit configured to determine whether there is an object outside of the apparatus, based on a first reflected wave received by the reception unit for the first wave and a second reflected wave received by the reception unit for the second wave.

According to the present invention, it is possible to improve the accuracy of object detection by a sensor that detects objects based on a reflected wave.

Further features of the present invention will become apparent from the following description of exemplary embodiments with reference to the attached drawings.

BRIEF DESCRIPTION OF THE DRAWINGS

FIGS. 8A, 8B-1, and 8B-2 are flowcharts for illustrating determination control processing in the ultrasonic sensor apparatus.

FIG. 9 is a view that illustrates a detection range of the ultrasonic sensor apparatus in a multifunction peripheral.

DESCRIPTION OF THE EMBODIMENTS

Figure 1:
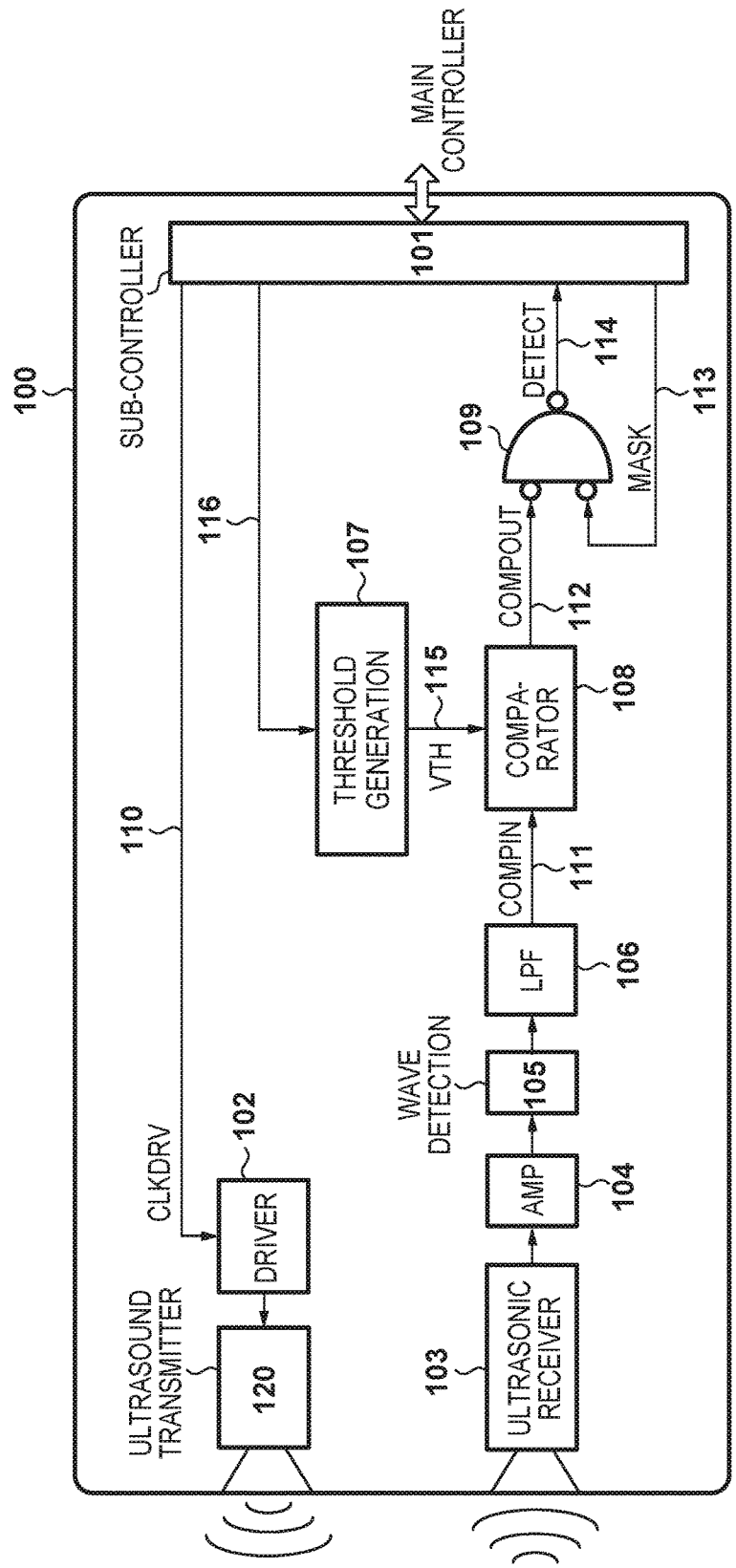
FIG. 1 is a view that illustrates a configuration of an ultrasonic sensor apparatus.

Embodiments of the present invention will be described hereinafter in detail, with reference to the accompanying drawings. Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals have been added to the same configuration elements, and explanation thereof is omitted.

[First Embodiment]

FIG. 9 is a view illustrating a positional relationship between a user and a multifunction peripheral 10 in the present embodiment. In the present embodiment, the multifunction peripheral 10 is an image forming apparatus that can execute a plurality of functions, such as a print function, a scanner function, a copy function, and a FAX function. In addition, the multifunction peripheral 10 is provided with an ultrasonic sensor apparatus 100 for detecting a person (a user) who approaches. The ultrasonic sensor apparatus 100 has a transmission unit for transmitting a transmitted wave such as an ultrasonic wave for detecting an object that is outside and a reception unit for receiving a received wave from outside, and the ultrasonic sensor apparatus 100 has a fan shaped detection range as illustrated by the dashed lines in the lower part of FIG. 9. When a received wave received by the reception unit is a reflected wave from the transmitted wave reflecting an object in the detection range, it is possible to detect a person who approaches the multifunction peripheral 10.

Here, it is assumed that the multifunction peripheral 10 is in a sleep state. The sleep state is a state in which power consumption is smaller than a standby state in which the multifunction peripheral 10 can use any function that it is capable of executing. When a person who approaches is detected by the ultrasonic sensor apparatus 100, the multifunction peripheral 10 returns to the standby state from the sleep state. In the present embodiment, the ultrasonic sensor apparatus 100 is an ultrasonic sensor for outputting a 40 kHz pulse wave that is in a non-audible frequency range, and receiving a reflected wave that is reflected from an object that is a detection target. The ultrasonic sensor apparatus 100 can detect an object and measure a distance between the detected object and the ultrasonic sensor apparatus 100 (the multifunction peripheral 10).

FIG. 1 is a view illustrating a block configuration of the ultrasonic sensor apparatus 100. A subcontroller 101 comprehensively controls the ultrasonic sensor apparatus 100. The subcontroller 101 is configured by a one chip microcomputer or the like, performs a determination of the existence or absence of an object in accordance with a program, and a determination result thereof is notified to a main controller 1100 of the multifunction peripheral 10 via an interface with the main body of the multifunction peripheral 10.

An ultrasound (ultrasonic) transmitter 120 is configured by a piezoelectric element or the like, and outputs an ultrasonic wave by oscillating in accordance with a clock drive signal input from a clock driver 102 that is described later. In the present embodiment, an element such that sound pressure efficiency becomes a maximum at a nominal frequency of 40 kHz is used. The clock driver 102 is configured by a buffer IC or the like having a high driving capability, buffers a clock waveform 110 (a CLKDRV signal) output from the subcontroller 101, and outputs a clock drive signal to the ultrasound transmitter 120.

An ultrasonic (ultrasound) receiver 103 is configured by a piezoelectric element or the like, detects an ultrasonic wave received from outside, and outputs a voltage signal in accordance with a strength of the detected ultrasonic wave. A voltage amplifier 104 is configured by an operational amplifier or the like, and amplifies and outputs the voltage signal output from the ultrasonic receiver 103. A wave detection circuit 105 is configured by diodes or the like, and performs a full wave rectification by a GND reference so that the voltage signal amplified and output from the voltage amplifier 104 is easier to process by a subsequent stage. A low-pass filter (LPF) circuit 106 is configured by a resistor and a capacitor for example, filters high frequency ripples of a full-wave rectified signal output from the wave detection circuit 105, and outputs a smooth waveform signal 111 (a COMPIN signal). A comparator 108 performs a comparison of whether the COMPIN signal 111 is larger in relation to a threshold voltage VTH 115 output from a threshold generation circuit 107, and outputs a comparison result thereof as a digital signal 112 (a COMPOUT signal).

The threshold generation circuit 107 outputs the threshold voltage 115 in accordance with a threshold setting signal 116 output from the subcontroller 101. In the present embodiment, the comparator 108 outputs the COMPOUT signal 112 at a LOW level when a condition of "the COMPIN signal 111>the VTH signal 115" is satisfied. A negative input NAND gate 109 is input with the COMPOUT signal 112 output by the comparator 108 and a MASK signal 113 (a MASK signal) output by the subcontroller 101, and outputs a DETECT signal 114. In the present embodiment, the DETECT signal 114 is a digital signal at the LOW level at a time of detection of an object, and the MASK signal 113 is a digital signal at the HIGH level during a masking interval.

Figure 3:
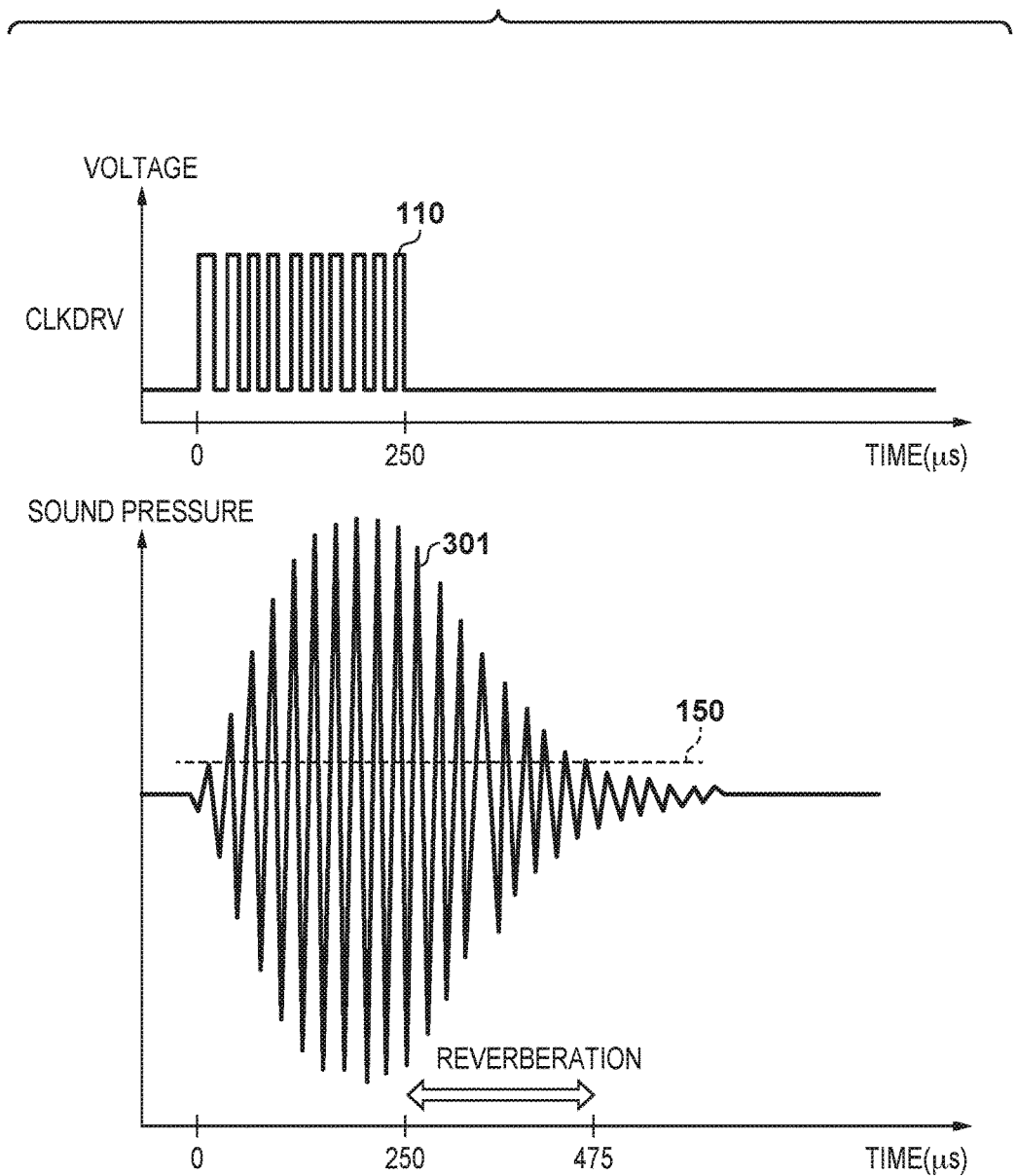
FIG. 3 is a view that illustrates reverberation characteristics at a time of oscillation of an ultrasonic transmitter.

FIG. 3 is a view that illustrates reverberation characteristics at a time of oscillation of an ultrasonic transmitter 120. FIG. 3 illustrates a situation in which the subcontroller 101 outputs, as the CLKDRV signal 110, ten pulses of a 40 kHz clock signal. The clock driver 102 drives the ultrasound transmitter 120 in accordance with the CLKDRV signal 110 to cause an ultrasonic wave to be generated. A waveform 301 is a waveform indicating sound pressure of the generated ultrasonic wave. The sound pressure waveform gradually increases immediately after the start of the driving clock, and becomes a maximum sound pressure by the tenth driving clock. After the tenth driving clock, the sound pressure is saturated by the characteristics of the ultrasound transmitter 120. Although driving stops by the tenth driving clock, in accordance with the characteristics of the ultrasound transmitter 120 itself, a reverberation phenomenon occurs in which the oscillation does not stop immediately but attenuates while vibration continues. As illustrated in FIG. 3, for example, there is a reverberation interval from 250 to 475 µs (225 µs) for the sound pressure to decrease below a predetermined threshold 150 after the stopping of driving of the ultrasound transmitter 120.

Figure 4:
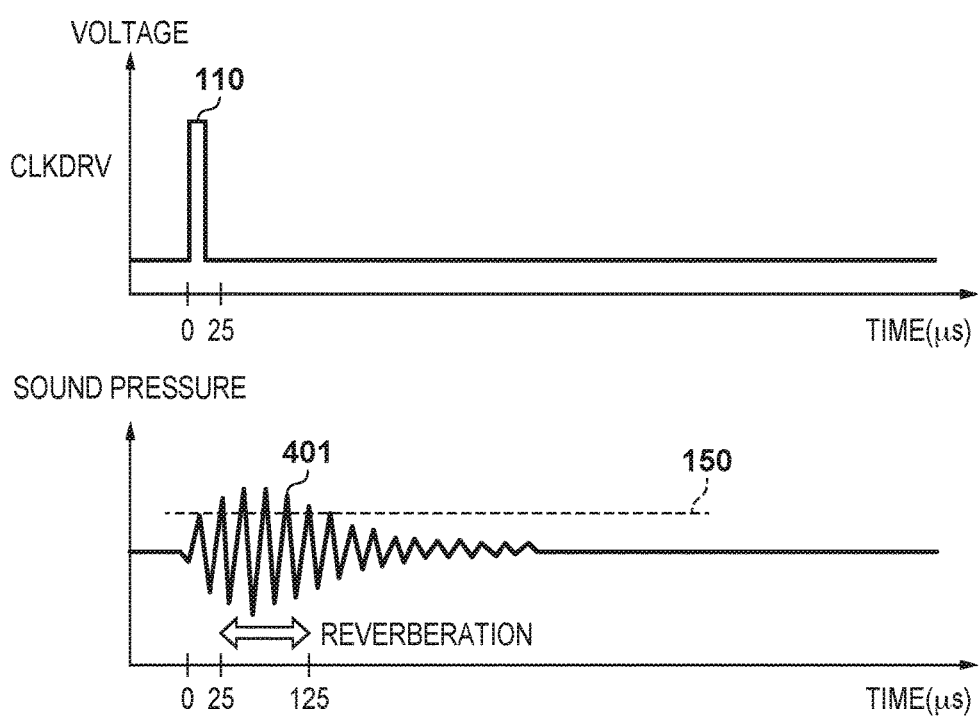
FIG. 4 is another view that illustrates reverberation characteristics at a time of oscillation in the ultrasonic transmitter.

FIG. 4 is another view that illustrates reverberation characteristics at a time of oscillation of the ultrasonic transmitter 120. FIG. 4 differs from FIG. 3 in that the subcontroller 101 only outputs one pulse for a 40 kHz clock signal as the CLKDRV signal 110. A waveform 401 is a waveform that represents sound pressure of a generated ultrasonic wave, but the sound pressure is small and convergence of the reverberation is earlier. As illustrated in FIG. 4, for example, there is a reverberation interval from 25 to 125 µs (100 µs) for the sound pressure to decrease below the predetermined threshold 150 after the stopping of driving of the ultrasound transmitter 120, and the reverberation interval is shorter than that in FIG. 3.

Although FIG. 3 and FIG. 4 illustrate reverberation characteristics of only the ultrasound transmitter 120, there may be cases in which vibration is transmitted to the housing of the multifunction peripheral 10 to also add a reverberation phenomenon of the housing, in accordance with an attachment state of the ultrasonic sensor apparatus 100 to the multifunction peripheral 10. In such a case, overall convergence of reverberation is further delayed. Because the ultrasonic receiver 103 and the ultrasound transmitter 120 are normally present in the same apparatus, it is difficult to completely disconnect them acoustically. Therefore, the ultrasonic receiver 103 is influenced by the ultrasound transmitter 120 due to, for example, reverberation, resonance, and diffraction of an ultrasonic oscillation wave. As a result, discrimination cannot be made between whether waves detected by the ultrasonic receiver 103 in an ultrasonic oscillation interval or a reverberation interval are reflected waves from an object due to an ultrasonic transmitted wave or something due to a direct influence of the ultrasonic oscillation wave.

Figure 5:
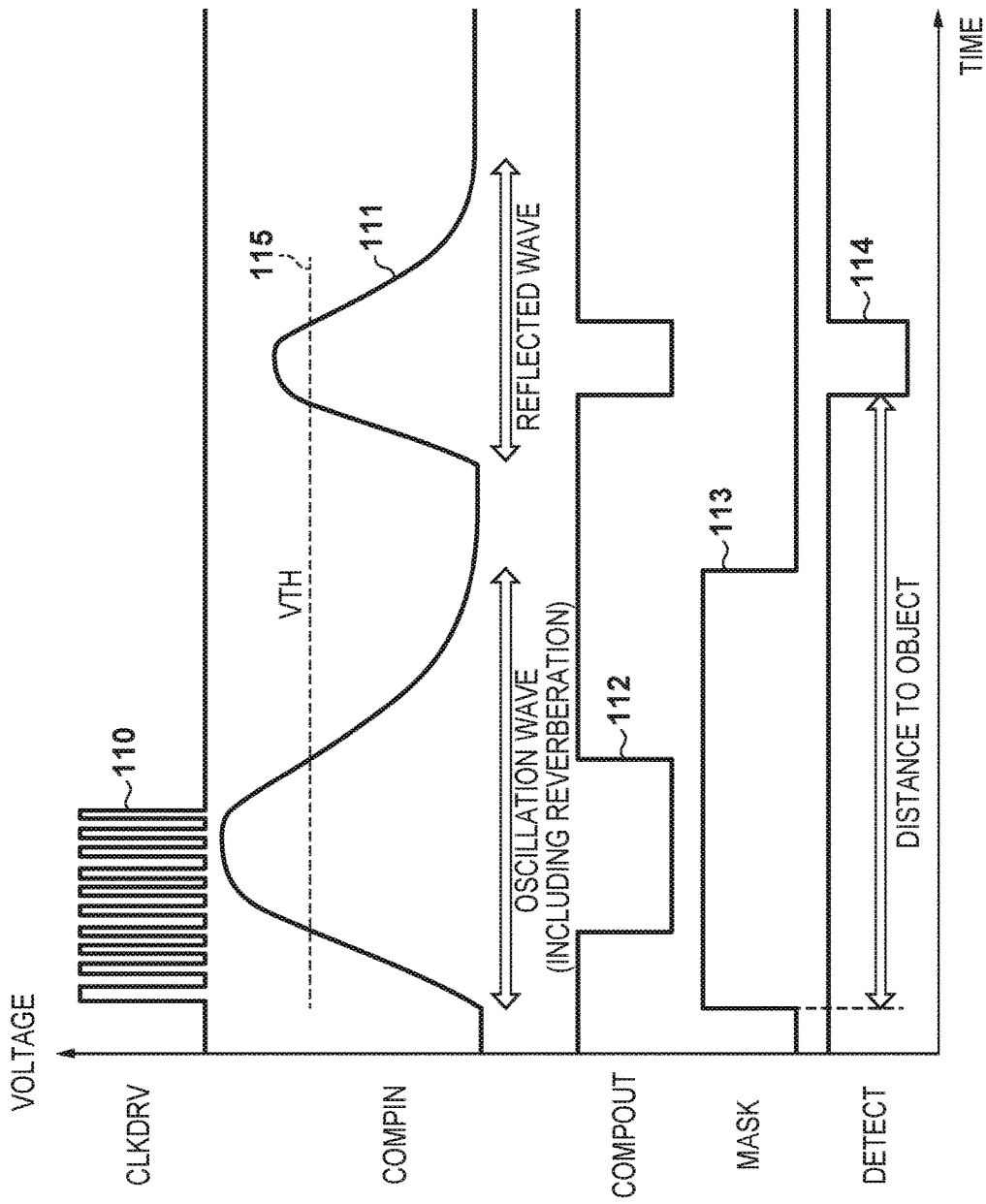
FIG. 5 is a view that illustrates a timing chart for each signal in the ultrasonic sensor apparatus.

FIG. 5 is a view illustrating a timing chart of each signal of the ultrasonic sensor apparatus 100 in a normal determination frame. In the present embodiment, a normal determination frame represents a detection mode of the ultrasonic sensor apparatus 100 for covering the entire zone of distances at which the ultrasonic sensor apparatus 100 can detect an object. An ordinate of FIG. 5 represents a voltage level of each signal, and an abscissa represents time. As illustrated in FIG. 5, in a normal determination frame, the subcontroller 101 outputs ten 40 kHz clock signals as the CLKDRV signal 110.

The COMPIN signal 111 is a voltage waveform after processing via the voltage amplifier 104, the wave detection circuit 105, and the low-pass filter circuit 106 for an ultrasonic wave received by the ultrasonic receiver 103. The mountain shape waveform on the left side of the COMPIN signal 111 is a waveform that corresponds to the direct wave that includes the reverberation and the oscillation wave of the ultrasound transmitter 120. In contrast, the mountain shape waveform of the right side is a waveform that corresponds to a reflected wave from an object.

The COMPOUT signal 112 indicates a comparison result between the COMPIN signal 111 and the VTH signal 115 output by the threshold generation circuit 107 in accordance with an instruction by the subcontroller 101. The comparator 108 outputs a digital signal at a LOW level as the COMPOUT signal when the condition of "COMPIN 111>VTH 115" is satisfied. In the case of a normal determination frame, the sound pressure of an ultrasonic oscillation wave is high and the level of the reflected wave is also high. Therefore, the VTH signal 115 is set to be relatively higher than a short distance determination frame that is described later so that a determination result is not in error due to excessive noise or the like. Although it is not shown, the level of a reflected wave decreases as the distance to an object increases. Therefore, the subcontroller 101 can control so that the VTH signal 115 is continuously or discretely lowered with the passage of time.

The MASK signal 113 is a digital signal that is output from the subcontroller 101. The subcontroller 101 outputs a digital signal at a HIGH level for a predetermined interval that corresponds to the direct wave that includes reverberation and the ultrasonic oscillation wave of the ultrasonic transmitter 120. The COMPOUT signal which is the determination result of the comparator 108 is masked in accordance with the MASK signal 113. The DETECT signal 114 indicates a determination result of the comparator 108 in an interval in which masking by the MASK signal 113 is not performed in accordance with the NAND gate 109, and is output to the subcontroller 101. The subcontroller 101 calculates a distance to the object based on time from a leading edge (rising) of the MASK signal 113 until a leading edge (falling) of the DETECT signal 114.

Figure 6:
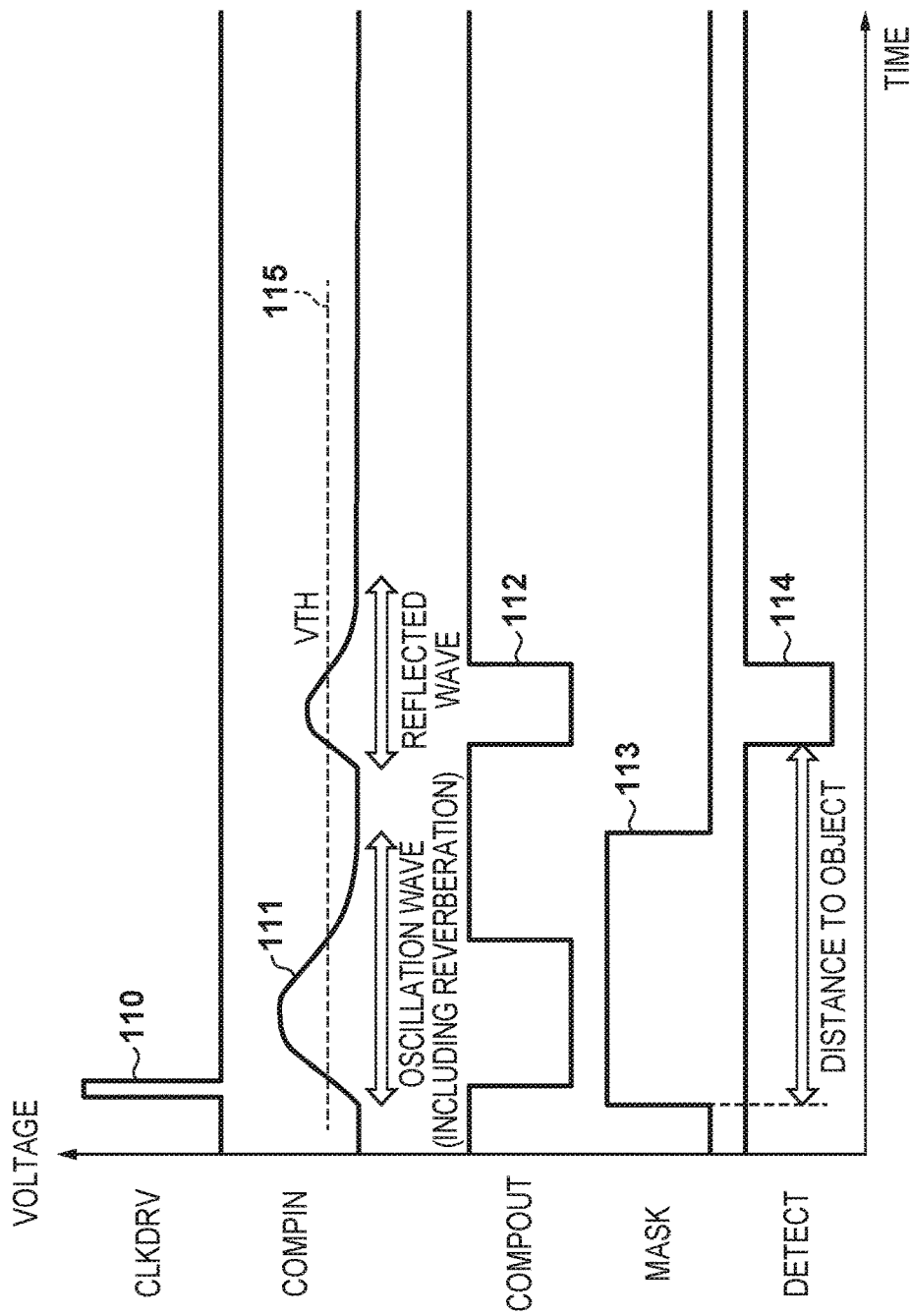
FIG. 6 is a view that illustrates a timing chart for each signal in the ultrasonic sensor apparatus.

FIG. 6 is a view illustrating a timing chart of each signal of the ultrasonic sensor apparatus 100 in a short distance determination frame. In the present embodiment, a short distance determination frame represents a detection mode for covering a short distance portion of distances at which the ultrasonic sensor apparatus 100 can detect an object. FIG. 6 differs from FIG. 5 in a point that the subcontroller 101 only outputs one pulse for a 40 kHz clock signal as the CLKDRV signal 110. Because the sound pressure of an ultrasonic oscillation wave is low and the level of a reflected wave is low in the case of a short distance determination frame, the subcontroller 101 sets the VTH signal 115 to be relatively low in comparison to the case of a normal determination frame.

The operation of each signal is the same as with the description for FIG. 5. Even in a short distance determination frame, the subcontroller 101 calculates a distance to the object based on time from a leading edge (rising) of the MASK signal 113 until a leading edge (falling) of the DETECT signal 114.

As described above, in the present embodiment, the DETECT signal for determining the detection of an object is generated, in accordance with the VTH signal and the MASK signal, from a reception signal that is output based on a received wave that is received by the ultrasonic receiver 103. The VTH signal and the MASK signal are reference signals that are references for generating the DETECT signal, and have predetermined values (size, interval, or the like) in accordance with each of a short distance determination frame or a normal determination frame. In other words, in a short distance determination frame, reference signals having predetermined values such that it is possible to improve the accuracy of the detection of an object at a short distance are used to generate the DETECT signal. Therefore, by a configuration in which the normal determination frame and the short distance determination frame are alternatingly performed, while enabling the detection of an object in an entire region where detection is possible, in particular it is also possible to improve the accuracy of object detection at a short distance where the ultrasonic receiver 103 is easily affected by a direct wave.

Figure 7:
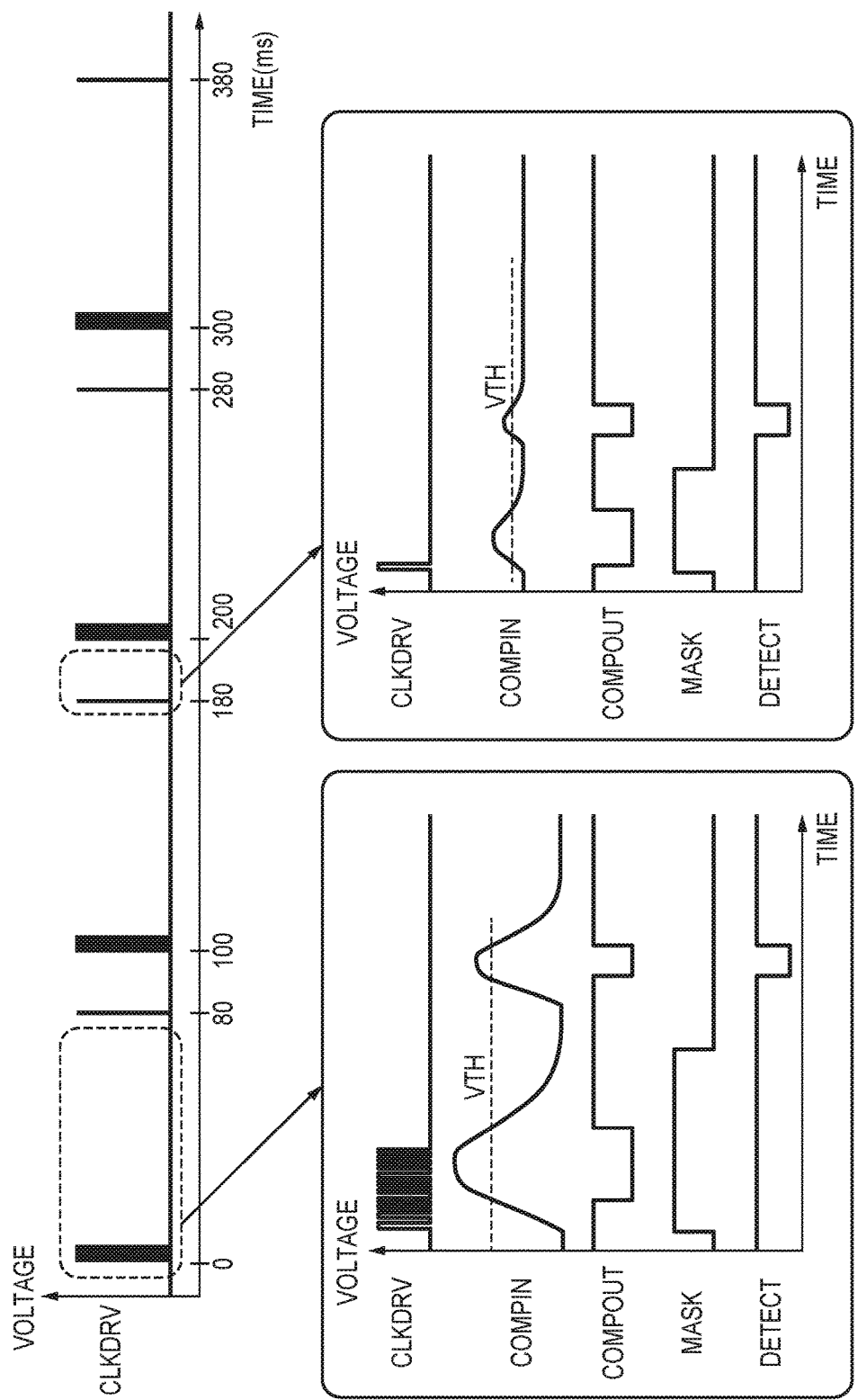
FIG. 7 is a view that describes a determination operation of the ultrasonic sensor apparatus.

FIG. 7 is a view for describing a determination operation of the ultrasonic sensor apparatus 100 in the present embodiment. In particular FIG. 7 illustrates a transition of the CLKDRV signal 110. The ordinate of FIG. 7 represents voltage level, and the abscissa represents time. The CLKDRV signal 110 illustrated by the bold line at time 0 ms corresponds to the ten waves of a 40 kHz clock illustrated in FIG. 5. The CLKDRV signal 110 illustrated by the thin line at time 80 ms corresponds to the one wave of a 40 kHz clock illustrated in FIG. 6. In other words, the ultrasonic sensor apparatus 100 operates as a normal determination frame described by FIG. 5 in the 80 ms time period from time 0 to 80 ms, and operates as a short distance determination frame described by FIG. 6 in a 20 ms time period from time 80 to 100 ms. The subsequent bold lines and thin lines respectively correspond to a normal determination frame of FIG. 5 and a short distance determination frame of FIG. 6.

In the present embodiment, the normal determination frames and the short distance determination frames are alternatingly switched at a 1:1 ratio, as illustrated in FIG. 7. In other words, the ultrasonic sensor apparatus 100 performs transmission control so as to alternatingly perform a mode for detecting in an entire region for which detection is possible and a mode specialized for detection at a short distance, by transmitting ultrasonic waves that respectively correspond to each mode. By such a configuration, it is possible to improve the precision of detection in a short distance range while covering an entire region in which detection is possible.

Figure 10:
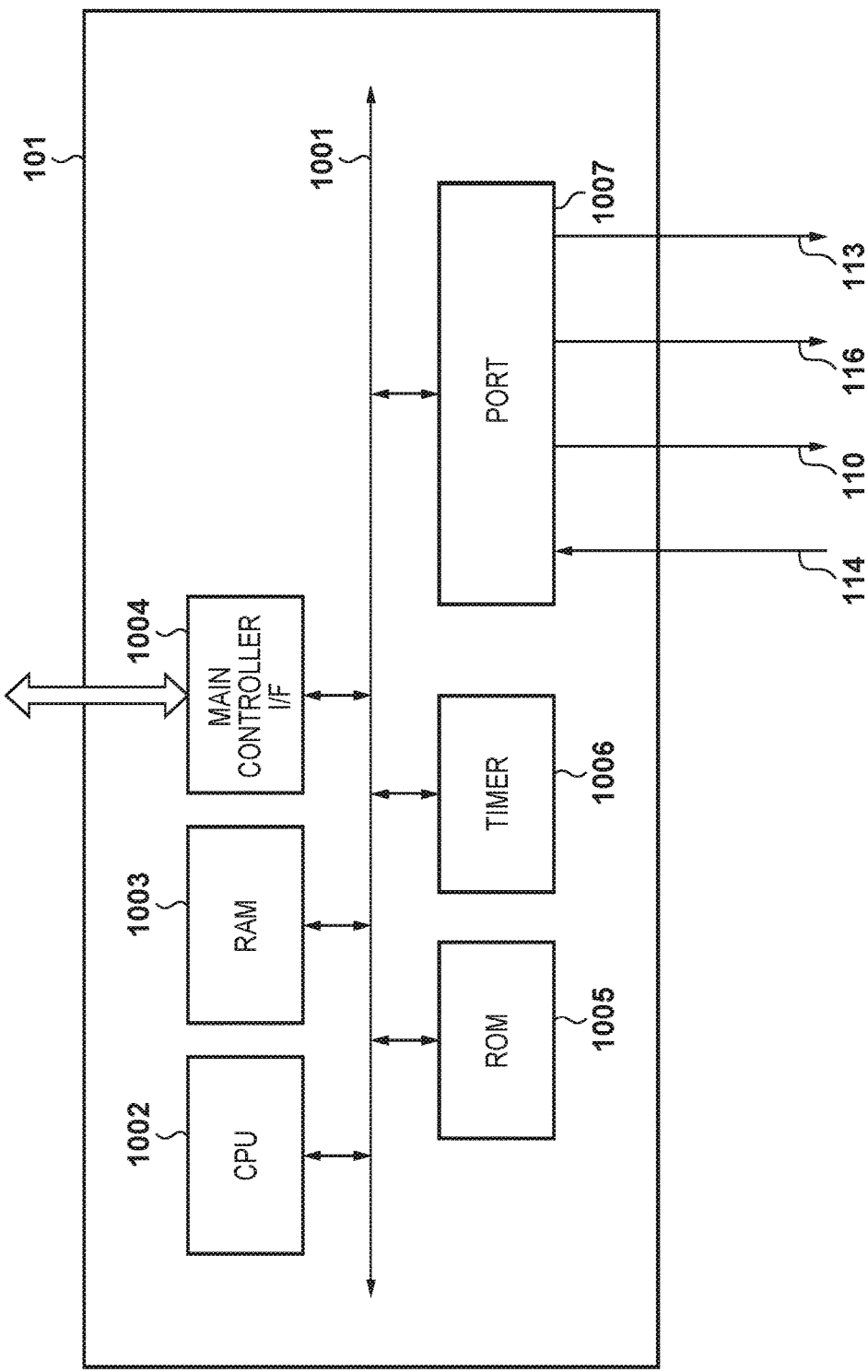
FIG. 10 is a view for illustrating a configuration of a subcontroller.

FIG. 10 is a view illustrating a block configuration of the subcontroller 101. The subcontroller 101 is configured by a one chip microcomputer, for example. An internal bus 1001 mediates data input/output among blocks connected to the internal bus 1001. A CPU 1002 comprehensively controls the subcontroller 101, and for example executes processing of FIG. 6 that is described later in accordance with a program. A RAM 1003 is a work memory for storing data for the CPU 1002 to operate. A ROM 1005 is read-only memory for storing the program of processing of FIG. 6 which is described later.

A main controller interface (I/F) 1004 is an interface with the main controller 1100 of the multifunction peripheral 10. The CPU 1002 communicates a detection result for an object to the main controller 1100 of the multifunction peripheral 10, via a main controller interface 1004. A timer 1006 counts time in accordance with an instruction by the CPU 1002. An input/output port 1007 outputs a digital signal to an external unit in accordance with an instruction by the CPU 1002, and notifies a state of a digital signal input from an external unit to the CPU 1002. As illustrated in FIG. 10, the input/output port 1007 outputs the CLKDRV signal 110, the threshold setting signal 116, and the MASK signal 113, and is input with the DETECT signal 114.

Figure 11:
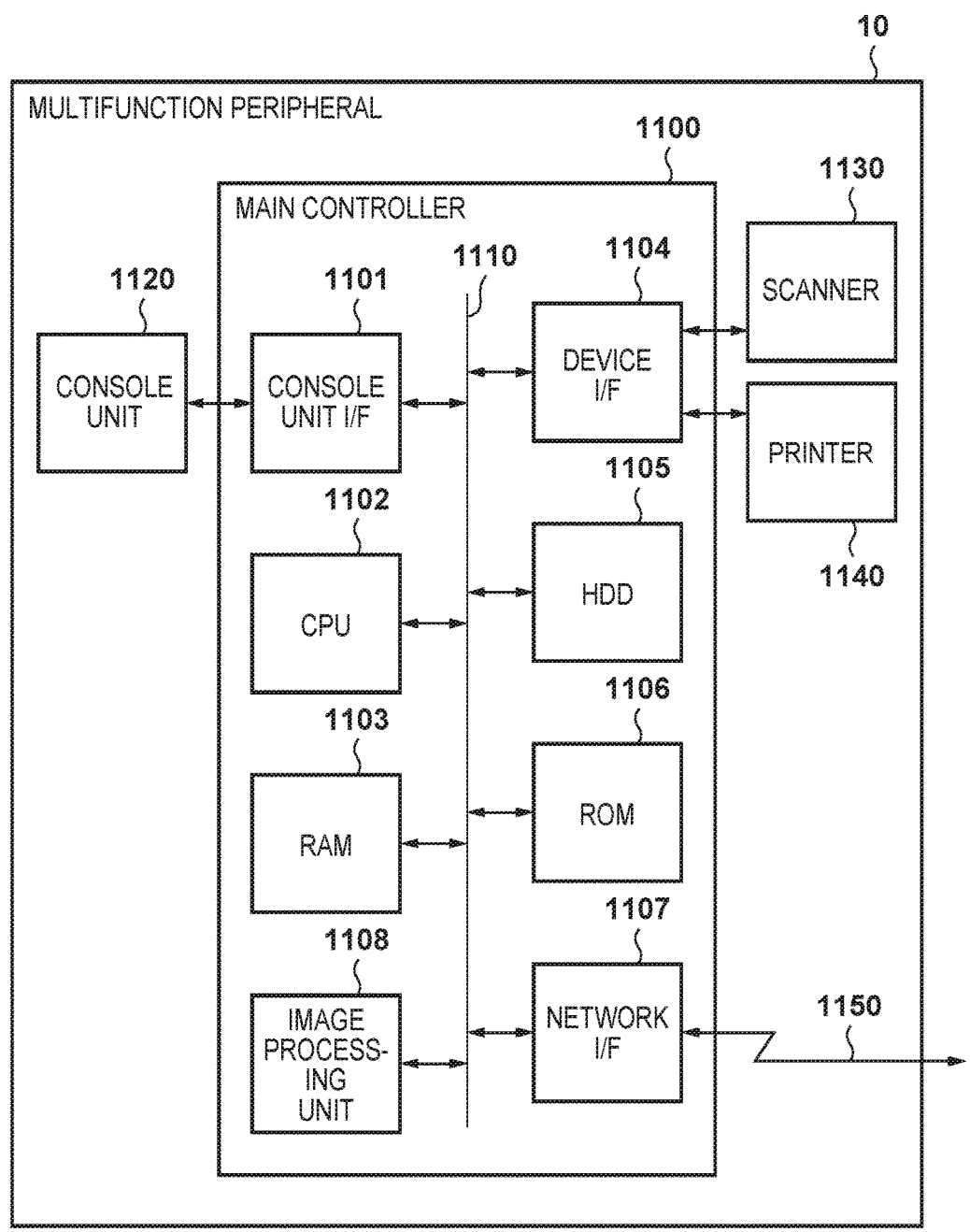
FIG. 11 is a view for illustrating a configuration of the multifunction peripheral.

FIG. 11 is a block diagram illustrating a configuration of the multifunction peripheral 10. The multifunction peripheral 10 includes the main controller 1100, a console unit 1120, a scanner 1130, and a printer 1140. The main controller 1100 is connected to the console unit 1120, and is also connected to the scanner 1130 which is an image input device, and the printer 1140 which is an image output device.

The main controller 1100 includes a CPU 1102. The CPU 1102 activates an OS in accordance with a boot program that is stored in a ROM 1106. In addition, the CPU 1102 executes, on the OS, various processing by executing application programs (hereinafter an application) stored in a hard disk drive (HDD) 1105. A RAM 1103 is used as a working memory of the CPU 1102, and is used as an image memory region for temporarily storing image data. The HDD 1105 stores applications, image data, and setting values.

In addition to the ROM 1106 and the RAM 1103, a console unit I/F 1101, a device I/F 1104, a network I/F 1107, and an image processing unit 1108 are connected to a system bus 1110. The console unit I/F 1101 is an interface with the console unit 1120 that includes a touch panel or the like, and outputs to the console unit 1120 screen data that should be displayed on the console unit 1120. In addition, the console unit I/F 1101 transmits to the CPU 1102 information that is input by a user via the console unit 1120. The device I/F 1104 is connected to the scanner 1130 and the printer 1140, and performs synchronous/asynchronous conversion of image data. The network I/F 1107 performs transmission/reception of data with various apparatuses on a network 1150. The image processing unit 1108 performs processing such as input processing of image data read by the scanner 1130, output processing of image data to the printer, rotation/compression of an image, color space conversion, resolution conversion, and tone conversion.

FIGS. 8A, 8B-1, and 8B-2 are flowcharts for illustrating control processing of the subcontroller 101 of the ultrasonic sensor apparatus 100. The processing of FIGS. 8A, 8B-1, and 8B-2 is realized, for example, by the CPU 1002 reading a program stored in the ROM 1005 into the RAM 1003 and executing it.

FIG. 8A is a flowchart that illustrates initialization control processing. In step S801, the subcontroller 101 clears each of an N/T flag and an NFLAG flag to zero. The N/T flag is allocated in a storage region of the RAM 1003 for example, and is a flag for indicating which of a normal determination frame or a short distance determination frame to execute. The NFLAG flag is allocated in a storage region of the RAM 1003 for example, and is a flag that is enabled (set to 1) when an object at a short distance is detected in a normal determination frame.

Figure 2:
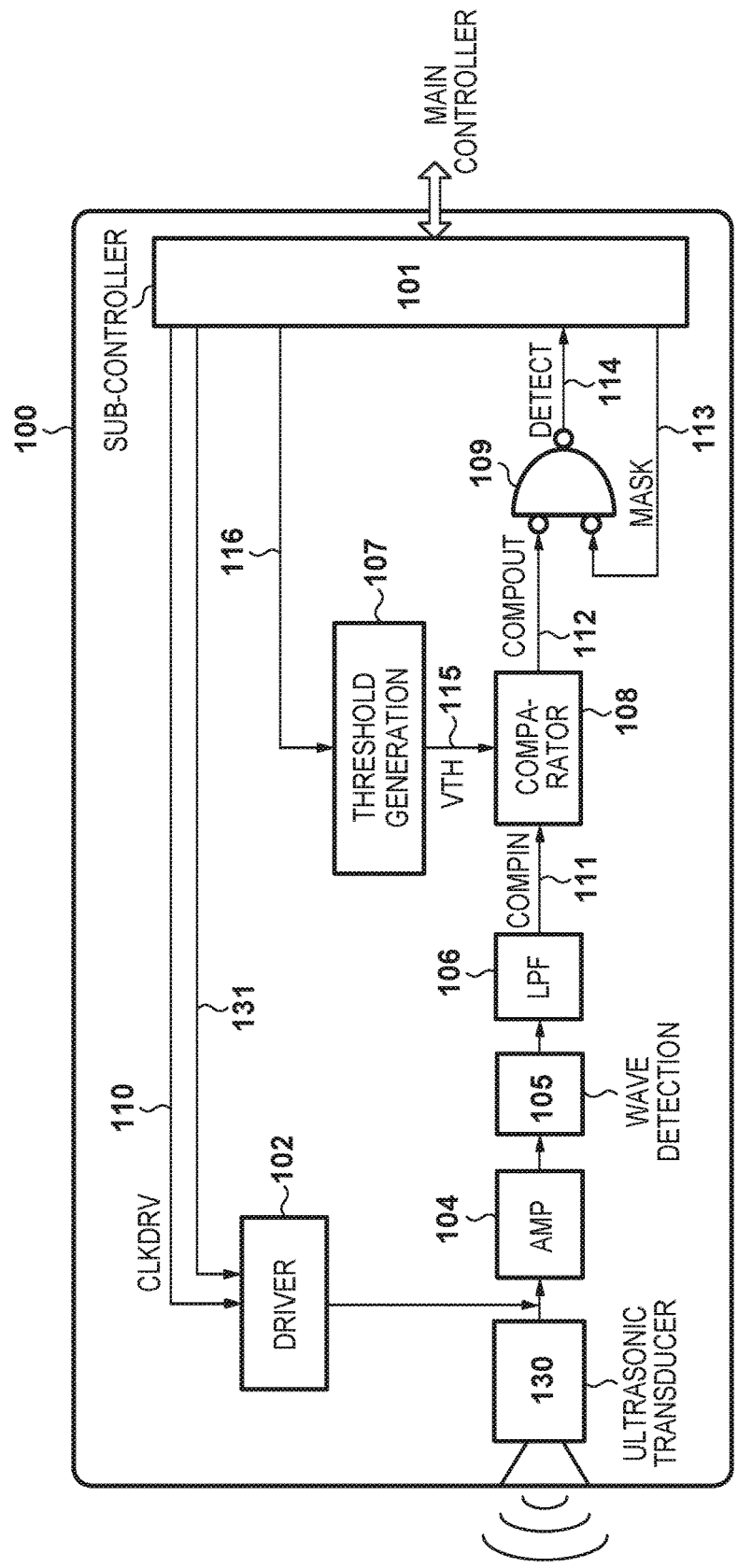
FIG. 2 is a view that illustrates another configuration of the ultrasonic sensor apparatus.
Figures 2, 8B:
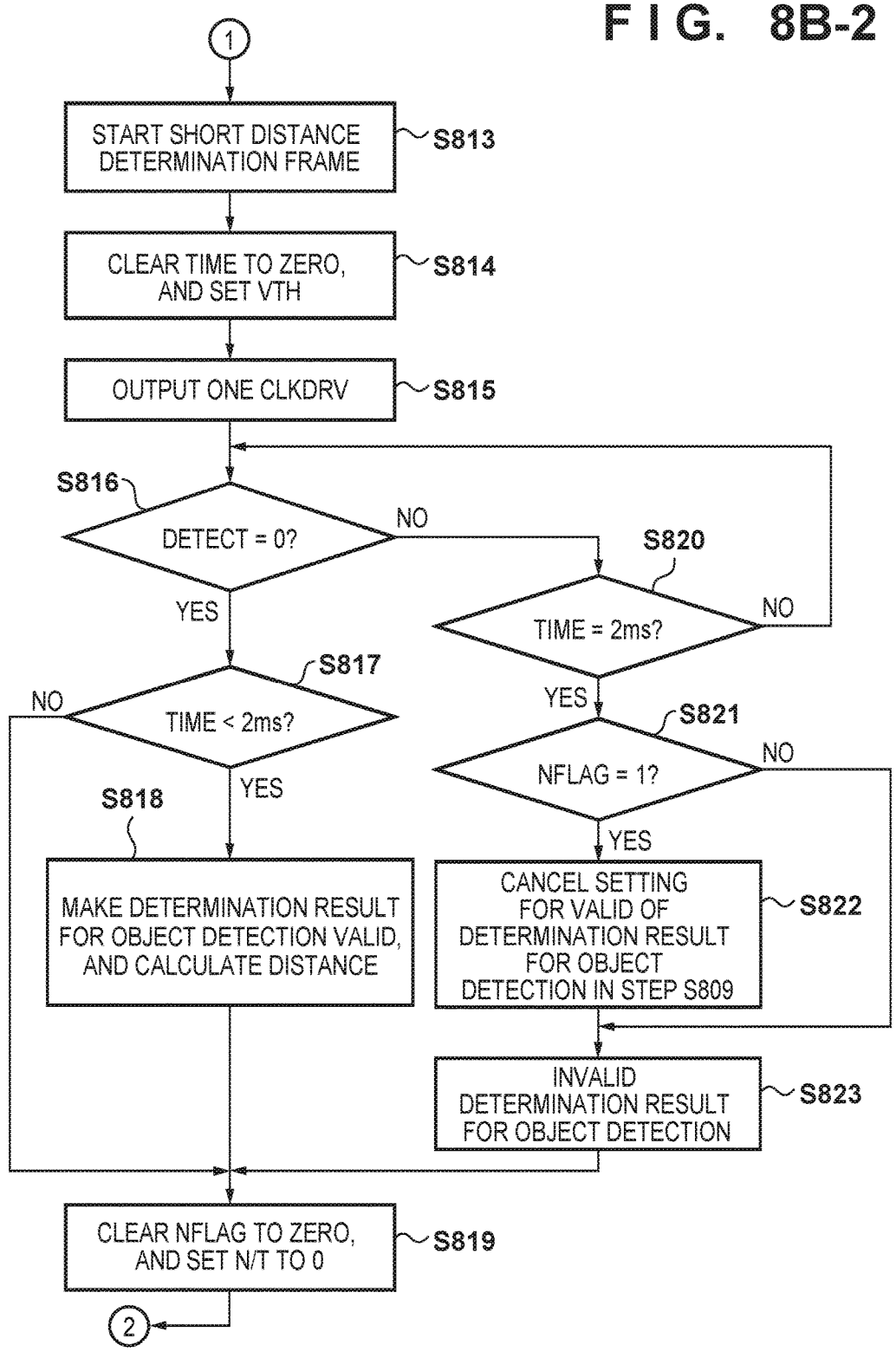

FIGS. 8B-1 and 8B-2 are flowcharts that illustrates determination control processing. In step S802, the subcontroller 101 determines whether N/T flag is 0 or 1. Here, the operation of a normal determination frame in step S803 and onward is executed if the N/T flag is 0, and the operation of a short distance determination frame in step S813 and onward is executed if it is 1.

In step S803, the subcontroller 101 starts operation of a normal determination frame. In step S804, the subcontroller 101 clears a time parameter allocated in a storage region such as the RAM 1003 to zero, and performs with respect to the threshold generation circuit 107 a setting instruction for VTH 115 that corresponds to the normal determination frame. The time parameter is parameter that expresses actual time by free-running.

In step S805, the subcontroller 101 outputs ten 40 kHz clock waveforms as the CLKDRV signal 110. In step S806, the subcontroller 101 determines whether the DETECT signal 114 has changed from 1 to 0. In other words, it determines whether an object outside the multifunction peripheral 10 is detected. Here, when it is determined that the DETECT signal 114 changed from 1 to 0, in step S807 the subcontroller 101 determines whether the time parameter is less than 2 ms. Here the 2 ms that is a reference value is a value derived from a value of the speed of sound and a distance at which a detection distance of the ultrasonic sensor apparatus 100 is judged to be a short distance, and it is not particularly limited to 2 ms.

If the time parameter is determined to be not less than 2 ms in step S807, the subcontroller 101 advances the processing to step S809. Meanwhile, if it is determined to be less than 2 ms in step S807, in step S808 the subcontroller 101 sets NFLAG to 1. Here NFLAG=1 indicates that a reflected wave has returned by the speed of sound within 2 ms (approximately 60 cm) in the normal determination frame, in other words that an object has been detected within 30 cm which is half of that.

In step S809, the subcontroller 101 sets the determination result for object detection in the normal determination frame to valid from the determination results in step S806 and step S807, and calculates a detection distance therefor. For example, the subcontroller 101 calculates the detection distance based on the detection time and a speed of sound value. In step S810, the subcontroller 101 sets the N/T flag to 1, and finishes operation for one normal determination frame.

As illustrated in FIG. 7, because the normal determination frames and the short distance determination frames are alternatingly performed repetitively, after the processing of step S810 has finished, processing from step S802 is executed again to execute the following frame. At that time, in the determination of step S802, because it is determined that the N/T flag=1, the processing of step S813 is advanced to. In addition, although this is described later, in step S819 of a short distance determination frame, the N/T flag is set to 0. As a result, normal determination frames and short distance determination frames are alternatingly executed repetitively as illustrated in FIG. 7.

In step S806, if it is determined that the DETECT signal 114 has not changed from 1 to 0, in other words if it is determined that an object outside of the multifunction peripheral 10 is not detected, in step S811 the subcontroller 101 determines whether the time parameter is 80 ms. Here the 80 ms that is a reference value is a value decided based on a limit value of a detection distance of the ultrasonic sensor apparatus 100, and it is not particularly limited to 80 ms.

If it is determined in step S811 that the time parameter is not 80 ms, the subcontroller 101 repeats the processing from step S806. Meanwhile if it is determined in step S811 that the time parameter is 80 ms, in step S812 the subcontroller 101 sets the determination of object detection in the normal determination frame to invalid (that an object is not detected in the normal determination frame). After the processing of step S812, the processing proceeds to step S810.

Next, explanation is given regarding the case when it is determined in step S802 that the N/T flag=1.

In step S813, the subcontroller 101 starts operation of a short distance determination frame. In step S814, the subcontroller 101 clears the time parameter to zero, and performs a setting instruction for VTH 115 corresponding to a short distance determination frame, with respect to the threshold generation circuit 107. A VTH 115 that corresponds to a short distance determination frame is set to be relatively lower than a VTH 115 that corresponds to a normal determination frame.

In step S815, the subcontroller 101 outputs one 40 kHz clock waveform as the CLKDRV signal 110. In step S816, the subcontroller 101 determines whether the DETECT signal 114 has changed from 1 to 0. In other words, it determines whether an object outside the multifunction peripheral 10 is detected. Here, when it is determined that the DETECT signal 114 changed from 1 to 0, in step S817 the subcontroller 101 determines whether the time parameter is less than 2 ms.

If it is determined in step S817 that the time parameter is not less than 2 ms, the subcontroller 101 advances the processing to step S819. Meanwhile, if it is determined in step S817 that the time parameter is less than 2 ms, in step S818 the subcontroller 101 sets the determination result for object detection at a short distance in the short distance determination frame to valid, from the determination results of step S816 and step S817. The subcontroller 101 then calculates the detection distance thereof. For example, the subcontroller 101 calculates the detection distance based on the detection time and a speed of sound value. In step S819, the subcontroller 101 clears the NFLAG to zero, sets the N/T flag to 0, and finishes operation for one short distance determination frame.

In step S816, if it is determined that the DETECT signal 114 has not changed from 1 to 0, in other words if it is determined that an object outside of the multifunction peripheral 10 is not detected, in step S820 the subcontroller 101 determines whether the time parameter is 20 ms. Here the 20 ms that is a reference value is a value decided based on a limit value of a short distance detection distance of the ultrasonic sensor apparatus 100, and it is not particularly limited to 20 ms.

If it is determined in step S820 that the time parameter is not 20 ms, the subcontroller 101 repeats the processing from step S816. Meanwhile, if it is determined in step S820 that the time parameter is 20 ms, in step S821 the subcontroller 101 determines whether NFLAG is set to 1. If it is determined in step S821 that NFLAG is not set to 1, the subcontroller 101 advances the processing to step S823. Meanwhile, if it is determined in step S821 that NFLAG is set to 1, in step S822 the subcontroller 101 cancels the setting for valid of the determination result for object detection in step S809 of the normal determination frame that was executed immediately prior.

For example, in a determination within a short distance of 30 cm, a determination operation in a short distance determination frame has higher accuracy than a determination operation in a normal determination frame. This is because a VTH signal corresponding to a short distance determination frame is used in a short distance determination frame, as illustrated in FIG. 5 and FIG. 6. Therefore, in the present embodiment, if a short distance determination result differs between a short distance determination frame and a normal determination frame immediately prior to the short distance determination frame, the determination result in the short distance determination frame is given priority. As a result, it is possible to perform object detection at a short distance with good accuracy. In step S823, the subcontroller 101 sets the determination of object detection in the short distance determination frame to invalid (that an object is not detected in the short distance determination frame). After the processing of step S823, the processing proceeds to step S819.

As described above, by virtue of the present embodiment, even when there is an influence from reverberation of an ultrasonic oscillation wave, it is possible to improve the accuracy of a short distance determination without impairing the concurrency of short/long determinations in a range of object detection.

[Second Embodiment]

Next, description will be given regarding a second embodiment. Because the present embodiment includes control and configurations of the first embodiment, explanation thereof is omitted for points in common, and explanation is given for points that are different.

FIG. 2 is a view illustrating a block configuration of the ultrasonic sensor apparatus 100 in the present embodiment. In the present embodiment, instead of the configuration of the ultrasonic transmitter 120 and the ultrasonic receiver 103 of FIG. 1, an ultrasonic transducer 130 is used. The ultrasonic transducer 130 is configured by a piezoelectric element, which is an element that integrates the ultrasonic receiver 103 and the ultrasound transmitter 120. A signal 131 is a signal for switching a drive strength of the clock driver 102. The signal 131 is output from the subcontroller 101, and in a normal determination frame the drive strength of the clock driver 102 is set to high, and in a short distance determination frame the drive strength of the clock driver 102 is set to low.

In the present embodiment, by enabling control of the drive strength of the clock driver 102 in this manner, it is possible to set the sound pressure of an oscillation wave in a short distance determination frame to be lower than the sound pressure in a normal determination frame. As a result, in accordance with control of sound pressure, the reverberation interval in a short distance determination frame is shorter than the reverberation interval in a normal determination frame. Regarding the relationship of the level of the threshold voltage VTH signal between a short distance determination frame and a normal determination frame, and the interval for output a digital signal for a HIGH level MASK signal, it is the same as in the first embodiment.

As another method for lessening reverberation in a short distance determination frame, for example configuration may be taken to have a method in which, with respect to the nominal frequency of 40 kHz at which the oscillation wave sound pressure of the ultrasonic transducer 130 becomes a maximum, the sound pressure is made smaller by shifting the frequency to 20 kHz or the like.

By virtue of the present embodiment, by a method for weakening the sound pressure of several ultrasonic oscillation waves, it is possible to improve the accuracy of a short distance determination without impairing the concurrency of short/long determinations of an object detection range, even when there is an influence from reverberation of an ultrasonic oscillation wave.

<Other Embodiments>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-041490, filed Mar. 3, 2016, which is hereby incorporated by reference herein in its entirety.

What is claimed is:

1. An apparatus having a sensor including an output unit for outputting a sonic wave and an input unit for inputting a sonic wave from outside, the apparatus comprising:
   a control unit configured to cause the output unit to output a first sonic wave for a first time period and a second sonic wave for a second time period following the first time period and which is shorter than the first time period; and
   a determination unit configured to determine whether there is an object in a first area, based on a first reflected wave of the first sonic wave input to the input unit after the output unit outputs the first sonic wave and after a first masking period longer than the first time period and overlapping with the first time period, and to determine whether there is an object in a second area which is closer to the apparatus than the first area, based on a second reflected wave of the second sonic wave input to the input unit after the output unit outputs the second sonic wave and after a second masking period longer than the second time period and overlapping the second time period and which is shorter than the first masking period.

2. The apparatus according to claim 1, wherein the control unit causes the output unit to alternatingly transmit the first sonic wave and the second sonic wave.

3. The apparatus according to claim 1, wherein the second sonic wave is for detecting an object at a detection distance shorter than a detection distance by the first sonic wave; and
   the apparatus further comprising:
   a generation unit configured to generate a signal for determining detection of the object based on a reception signal output from the input unit in accordance with each of the first sonic wave and the second sonic wave, and
   wherein the generation unit generates the signal for determining detection of the object from the reception signal output from the input unit and a reference signal in accordance with each of the first sonic wave and the second sonic wave.

4. The apparatus according to claim 3, wherein the reference signal includes a signal indicating a first threshold that corresponds to the first sonic wave and a signal indicating a second threshold that corresponds to the second sonic wave.

5. The apparatus according to claim 4, wherein the first threshold is higher than the second threshold.

6. The apparatus according to claim 3, wherein the reference signal includes a first mask signal for masking the reception signal during the first masking period that corresponds to the first sonic wave and a second mask signal for masking the reception signal during the second masking period that corresponds to the second sonic wave.

7. The apparatus according to claim 1, wherein a number of pulses of the first sonic wave is greater than a number of pulses of the second sonic wave.

8. The apparatus according to claim 1, wherein a frequency of the first sonic wave is greater than a frequency of the second sonic wave.

9. The apparatus according to claim 1, wherein a drive strength for a clock driver for causing the output unit to output the first sonic wave is greater than a drive strength for the clock driver for causing the output unit to output the second sonic wave.

10. The apparatus according to claim 9, wherein the sensor is an ultrasonic transducer.

11. The apparatus according to claim 1, wherein the apparatus is an image forming apparatus for forming images.

12. A method executed in an apparatus having a sensor including an output unit for outputting a sonic wave and an input unit for inputting a sonic wave from outside, the method comprising:
   causing the output unit to output a first sonic wave for a first time period and to output and a second sonic wave for a second time period following the first time period and which is shorter than the first time period; and
   determining whether there is an object in a first area, based on a first reflected wave of the first sonic wave input to the input unit after the output unit outputs the first sonic wave and after a first masking period longer than the first period and overlapping with the first time period, and determining whether there is an object in a second area which is closer to the apparatus than the first area, based on a second reflected wave of the second sonic wave input to the input unit after the output unit outputs the second sonic wave and after a second masking period longer than the second time period and overlapping the second time period and which is shorter than the first masking period.

* * * * *